United States Patent [19]

Hansen et al.

[11] Patent Number: 5,499,565

[45] Date of Patent: Mar. 19, 1996

[54] BELT CUTTING APPARATUS

[75] Inventors: Kenneth N. Hansen, Waukesha; Daniel E. Ertel, Oconomowoc, both of Wis.

[73] Assignee: Dorner Mfg. Corp., Hartland, Wis.

[21] Appl. No.: 298,576

[22] Filed: Aug. 31, 1994

[51] Int. Cl.$^6$ ..................................................... B26D 7/02
[52] U.S. Cl. ............................ 83/452; 83/544; 83/558; 83/599; 83/605
[58] Field of Search ..................... 83/452, 464, 553, 83/558, 562, 574, 581, 599, 605, 606, 614, 554, 564, 607

[56] References Cited

U.S. PATENT DOCUMENTS

| | | | |
|---|---|---|---|
| 118,419 | 8/1871 | Wood | 83/599 |
| 1,131,431 | 9/1915 | Smith | 83/599 |
| 1,398,202 | 11/1921 | Scarborough | 83/599 |
| 2,684,717 | 7/1954 | Jones et al. | 83/553 |
| 2,756,822 | 7/1956 | Jones | 83/553 |
| 3,693,489 | 9/1972 | Pearl | 83/452 |
| 4,951,540 | 8/1990 | Cross et al. | 83/599 |
| 5,052,256 | 10/1991 | Morrissey | 83/605 |

FOREIGN PATENT DOCUMENTS

| | | | |
|---|---|---|---|
| 2550350 | 5/1977 | Germany | 83/544 |

*Primary Examiner*—Richard K. Seidel
*Assistant Examiner*—Elizabeth Stanley
*Attorney, Agent, or Firm*—Andrus, Sceales, Starke & Sawall

[57] ABSTRACT

An apparatus for cutting a conveyor belt. The conveyor belt is clamped against a cutting surface on the base of the apparatus by a pair of parallel clamping bars. A lever arm is pivoted to, and is axially slidable on, a shaft disposed parallel to the clamping bars and the lever arm carries a cutting head. A pair of blades are mounted in an acute angle relation on the cutting head, and as the lever arm is manually pivoted downwardly, the blades cut a pair of slits in the belt. The lever arm is then pivoted up and advanced axially along the shaft and the cutting action is repeated to thereby cut a plurality of V-shaped fingers in the belt, which can be interdigitated with fingers of a second belt end and subsequently bonded together to provide an endless spliced belt.

20 Claims, 2 Drawing Sheets

5,499,565

BELT CUTTING APPARATUS

BACKGROUND OF THE INVENTION

Conveyor belts are fabricated in endless form by cutting a plurality of V-shaped fingers in each free end of the belt. The fingers are then interdigitated or spliced, and the spliced area is then fused by heat and pressure to provide the endless configuration.

Frequently it is necessary to replace a conveyor belt on the conveyor. As the belt may have a considerable length, perhaps 50 to 100 feet, and as the belt may be trained over a number of accessories and drive spindles, it is difficult to remove an existing belt and install a replacement belt on the conveyor. Instead, the common practice is to attach one end of the replacement belt to the existing belt, and as the existing belt is pulled through the conveyor, the replacement belt is drawn into the system. With the replacement belt drawn onto the conveyor, V-shaped fingers are then cut into the free ends of the replacement belt and spliced together to provide the endless configuration.

During operation of a conveyor, the belt may stretch beyond a length that can be accommodated by a normal belt tensioning system. To shorten the belt, the belt is severed, and fingers are cut in the free ends of the belt and spliced together to provide the endless configuration of the desired shortened length.

Various types of machines have been used in the past to cut the fingers in the belt end. In many cases, these machines are large and heavy and are not portable, so that they cannot be used to cut the belt ends on the conveyor itself. Thus, there has been a need for a lightweight, compact belt cutting device that can be used on the conveyor to cut the belt for splicing.

SUMMARY OF THE INVENTION

The invention is directed to an improved portable device for cutting a conveyor belt for splicing. The belt cutting devices includes a base and the belt is clamped to a cutting surface of the base by a pair of generally parallel clamping bars. A lever arm is pivoted to, and is slidable axially on, a shaft that is located parallel to the clamping bars, and the lever arm carries a cutting head.

Mounted on the cutting head is a pair of spaced blades that are located in an acute angle relationship to each other. As the lever arm is manually pivoted downwardly, the blades cut a pair of slits in the belt. The lever arm is then pivoted upwardly and advanced axially along the shaft. The cutting action is repeated to thereby cut a plurality of V-shaped fingers in the belt end which can be interdigitated with fingers of a second belt end and subsequently bonded together to provide the spliced endless belt.

As a feature of the invention, the belt cutting apparatus has a feed-through design which can accommodate either an endless belt or a free belt end. When cutting a free belt end, the end is fed across the cutting surface and inserted beneath the clamping bars. When cutting an endless belt, the pivot shaft and clamping bars are initially removed from the base and then re-assembled with the base after the belt is positioned on the cutting surface.

The lever arm which carries the cutting head is pivoted to the fixed shaft through a composite bushing, and the pivoting motion used to actuate the cutter head combined with lateral force, automatically advances the cutter head across the width of the belt.

As a further aspect of the invention, magnetic action is employed to hold the clamping bars against the base, and this provides a more uniform clamping pressure across the entire width of the belt.

The invention also incorporates spring loaded blade shields which extend downwardly adjacent the cutting edges of the blades. As the blades move into contact with the belt, the shields will be automatically retracted. The blade shields function to provide blade protection, as well as provide operator safety, and further provide localized holddown pressure of the belt adjacent the cutting area.

The cutting surface on which the belt is supported is preferably formed of a resilient material, such as urethane, which enables the leading edge of the blade to penetrate into the urethane support and provide additional stability for the blade during the cutting action.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

The drawings illustrate a lightweight, portable, belt cutting apparatus that can be employed to cut V-shaped fingers in a conveyor belt on the conveyor.

The apparatus includes a base or frame 1, including a pair of side members 2 connected by a pair of parallel cross beams 3 which preferably are aluminum extrusions.

Figure 1:
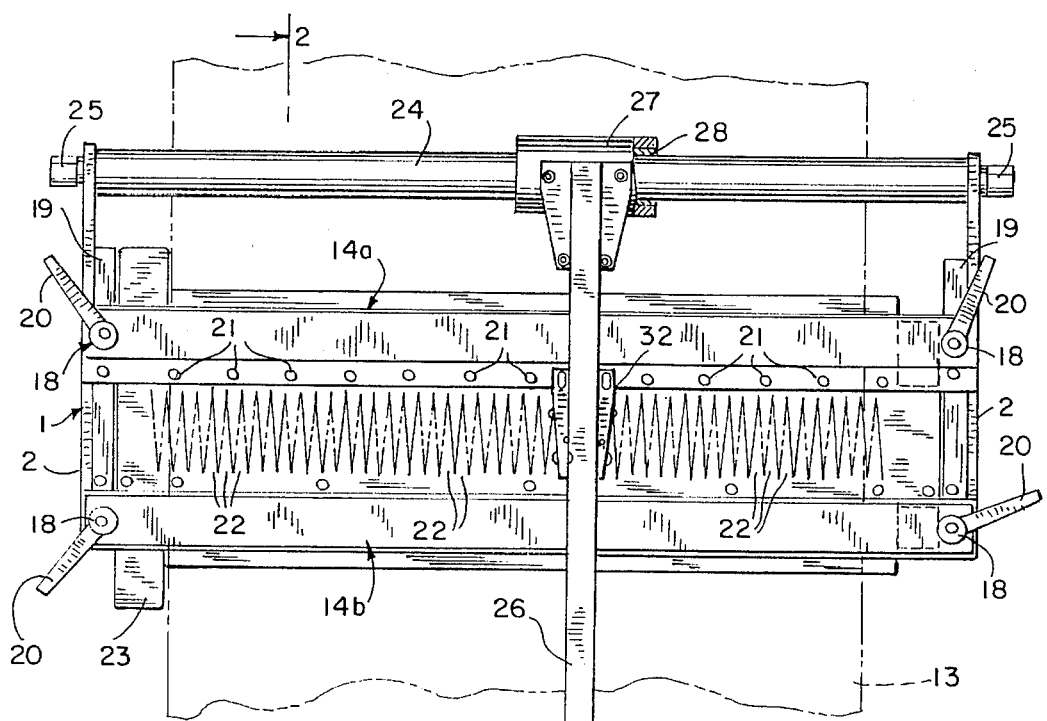
FIG. 1 is a top plan view of the belt cutting mechanism of the invention.
Figure 2:
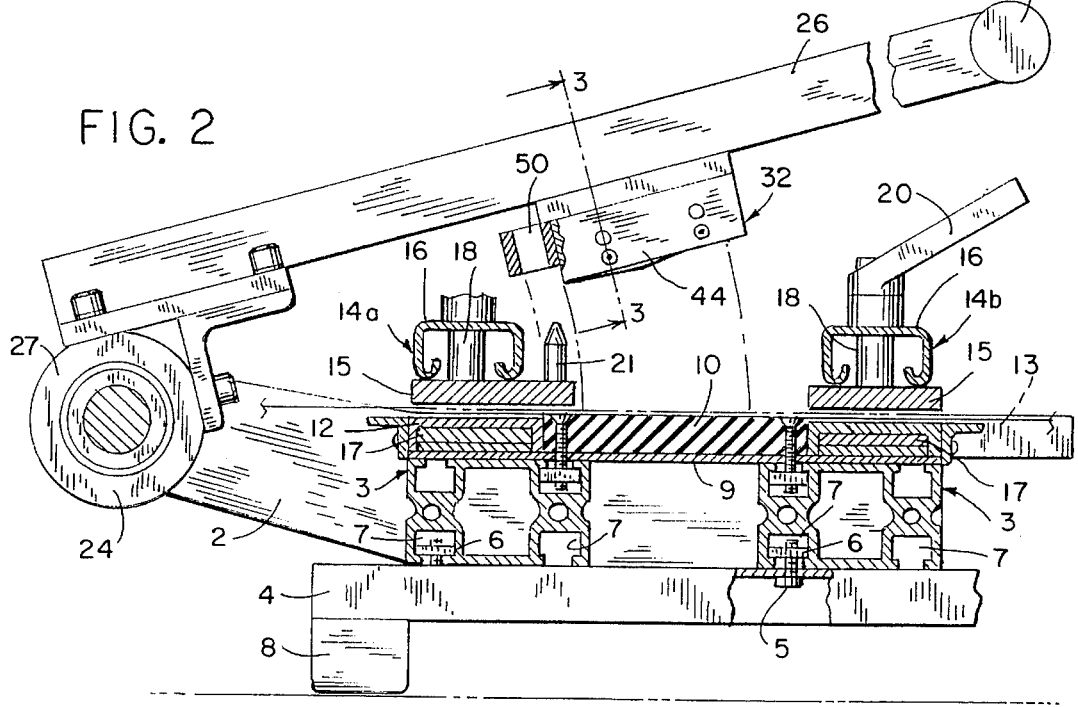
FIG. 2 is a section taken along line 2—2 of FIG. 1.

Base 1 is supported by a pair of elongated supports 4 which extend parallel to side members 2. As shown in FIG. 2, support members 4 are generally channel-shaped in cross section and are connected to cross members 3 by screws 5, which are engaged with nuts 6 that are slidable within channels 7 of the cross members. By loosening screws 5, nuts 6 can be slid within the channels 7 to thereby move the supports 4 in a direction toward and away from each other. Pads or feet 8 are connected to the lower surface of each support adjacent the ends thereof and are adapted to engage the foundation or other supporting surface.

Base 1 also includes a generally flat plate 9 that is supported on cross beams 3, and a cutting mat 10 formed of a resilient material, such as urethane, is mounted on the plate 9 between a pair of channel-shaped cross members 12. The portion of the belt 13 to be cut is supported on mat 10, as well as on the cross members 12.

A pair of clamping bar assemblies 14a and 14b are employed to clamp belt 13 against the cross members 12. Each clamping bar assembly 14 includes a bar 15 of a magnetically susceptible material, such as iron or steel, and a channel members 16 is mounted on the upper surface of each bar 15. Located within each cross member 12 is a magnet 17 and the magnetic force will draw the bars 15 downwardly against the belt 13 to firmly secure the belt to the base 1.

Each clamping bar 15 can be raised above the cross members 12 in order to feed the belt therebetween by a pair of jack screws 18. The lower ends of the jack screws 18 are threaded within openings in the upper surface of bar 19 secured to the inner surface of each side member 2. Mounted on the upper end of each jack screw 18 is a crank handle 20. Through rotation of the crank handles 20, the clamping bars 15 can be moved toward and away from the cross members 12. A plurality of tapered locating pins 21 project upwardly in spaced relation from the clamping bar assembly 14a, and the spacing between the pins is correlated with the configuration of the fingers 22 which are to be cut in the belt 13, as will be hereinafter described.

An edge guide 23 is mounted on base 1 adjacent one of the side members 2, and serves as a guide for one side edge of the belt 13 to be cut.

A cylindrical shaft 24 is mounted on base 1 and is parallel to the clamping bar assemblies 14a and 14b. The ends of shaft 24 are connected to the respective side members 2, through hand screws 25. By removing screws 25, which are threaded in the ends of shaft 24, the shaft can be removed from the base 1.

Mounted for both rotation and axial sliding movement on shaft 24 is a lever arm 26, which extends generally parallel to the side edges of belt 13. One end of lever arm 26 carries a sleeve 27 which houses a cylindrical bushing 28 formed of a composite plastic material. Bushing 28 enables the lever arm 26 to pivot about the shaft 24, as well as enabling the lever arm to slide axially along the shaft. A handle 29 is mounted on the outer end of lever arm 26 through a bearing 30 which enables the handle to rotate relative to the lever arm.

Figure 4:
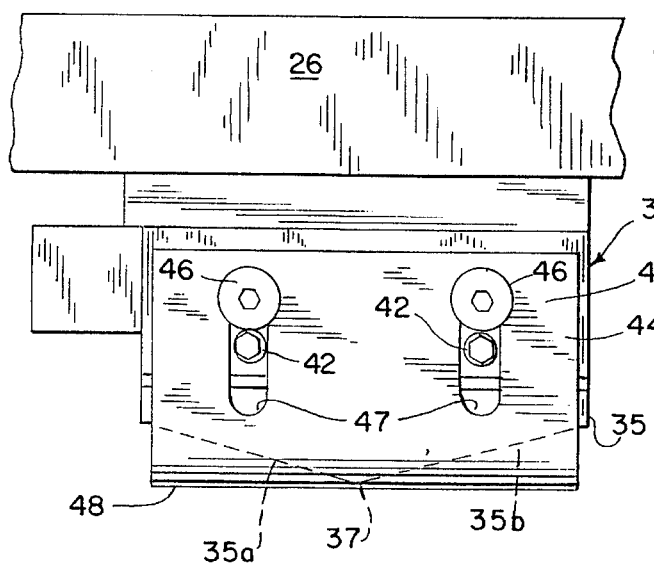
FIG. 4 is a side view of the cutting head.
Figure 5:
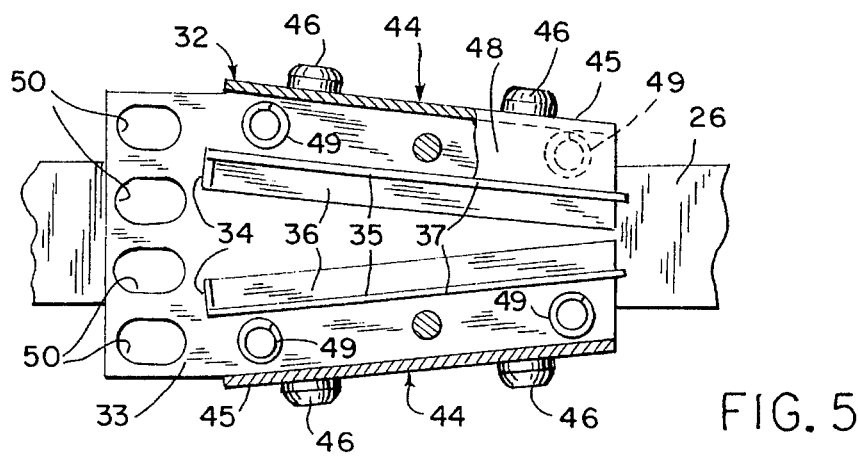
FIG. 5 is a bottom view of the cutting head.

The belt 13 is cut by a cutter head assembly 32 that is mounted on lever arm 26 and is spaced from the sleeve 27. Cutter head assembly 32 includes a block 33 that is secured to the underside of lever arm 26 and, as best shown in FIG. 5, the bottom surface of block 33 is formed with a pair of converging slots 34, each of which receives a cutting blade 35 and a clamping plate or connecting member 36. The outer cutting edge of blade 35 is generally V-shaped, as best illustrated in FIG. 4, with the cutting edge consisting of two straight edges 35a and 35b joined at a central apex 37.

Figure 3:
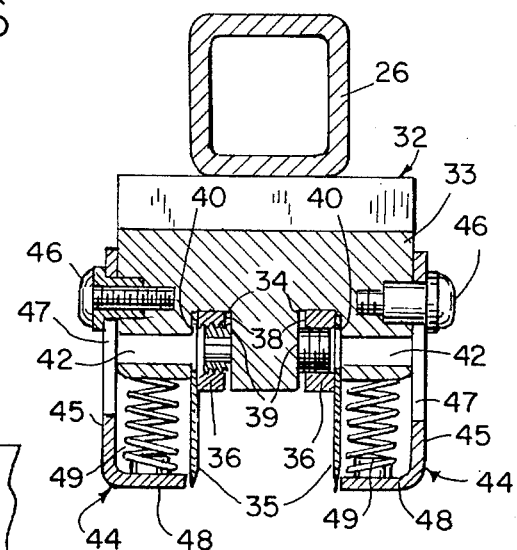
FIG. 3 is a section taken along line 3—3 of FIG. 2 showing the cutting head.

The manner of connecting the blades 35 to the cutter head block 33 is best illustrated in FIG. 3. Each clamping plate 36 is provided with a threaded hole 38 and a screw 39 is threaded within hole 38. Blade 35 is provided with an aligned hole 40 and block 33 is formed with an aligned hole 42. The end of screw 39 facing outwardly toward hole 40 is formed with a polygonal or hexagonal recess which is adapted to receive a hex key wrench that is inserted into the aligned holes 40 and 42. By turning down the screw 39, clamping plate 36 will be moved in a direction toward blade 35 to clamp the blade against the wall of the block 33. Conversely, by unthreading screw 39, the clamping force will be released and the blade 35 can be withdrawn from the slot 34. This provides a simple and convenient mechanism for connecting the blade 35 to the cutter head in which no parts have to be fully removed from the cutter head block 33.

As a feature of the invention, a safety shield 44 is mounted adjacent each blade 35. Each shield 44 includes a side surface 45 that is connected to the corresponding side of block 33 by bolts 46. Each bolt extends through an elongated slot 47 in the side wall 45. As shown in FIG. 3, each slot 47 is also aligned with holes 40 and 42, so that a tool, such as a hex-key wrench, can be inserted into the holes 40 and 42.

Each shield 44 is also provided with a base 48 which is disposed generally normal to the side wall 45, and the extremity of each base 48 terminates adjacent the respective blade 35, as shown in FIG. 3.

Each shield 44 is biased outwardly by a pair of springs 49. The inner end of each spring 49 bears against the lower surface of block 33, while the outer end of each spring engages base 48. The outer position of shield 44 is limited by the engagement of bolts 46 with the upper ends of the respective slots 47. In the inoperative position of the cutter head as shown in FIGS. 3 and 4, the base portion 48 of each shield 44 is biased outwardly to a position where it projects slightly beyond the apex 37 of the respective blade 35.

During the cutting stroke, as the blade 35 penetrates into the belt 13, the shields 44 will move upwardly against the force of the springs 49.

Shields 44 not only serve to protect the blades 35, but also serve a safety function in preventing accidental contact by the operator with the blades. During installation of the belt 13 on the cutting surface, lever arm 26 may be pivoted to a reverse position wherein the blades 35 will face upwardly in a location where they could be accidentally contacted. Thus, shields 44 serve to prevent accidental contact by the operator with the blades.

As a further function, shields 44 provide localized holddown pressure of the belt adjacent the cutting area.

As best seen in FIG. 5, the bottom surface of block 33 is formed with a plurality of spaced elongated openings 50, which are adapted to receive the locating pins 21 during the cutting operation. The spacing between openings 50 is correlated to the angularity and spacing of blades 35.

An endless belt can be cut by removing the two clamping bar assemblies 14a and 14b along with the pivot shaft 24. The belt can then be placed on the supporting mat 10 and the clamping bars, as well as the shaft can be reinstalled. With a non-endless belt the clamping bars 14a and 14b are elevated by operation of the cranks 20 and the free end of the belt is then inserted beneath the clamping bars 15. With the belt positioned on the cutting surface 10, the crank handles 20 are then operated to lower the clamping bars 15 and the magnetic action will hold the entire width of the belt 13 tightly against the cross members 12.

Figure 6:
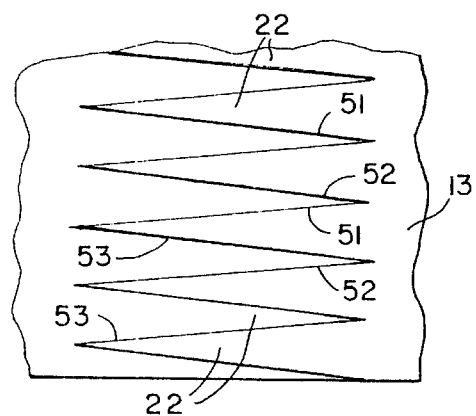
FIG. 6 is a plan view of a belt showing the cuts made by the cutting head.

When the cutting head is lowered through operation of the lever arm 26, a pair of spaced cuts 51 will be made in the belt, as shown in FIG. 6, and the lever arm is then raised and moved axially along shaft 24. The combination of raising the lever arm along with the application of lateral force will readily advance the cutter head for the next succeeding cut. The bushing 28 will tend to bind on shaft 24 if the handle 29 of lever arm 26 is merely moved laterally. However, if lateral force is applied during the vertical, pivotal movement of the lever arm 26, the bushing 28 will slide easily on the shaft to advance the cutter head. A second pair of cuts 52 are then made followed by a third pair of cuts 53. This action is continued across the width of the belt to provide the cut fingers 22. The engagement of the slots 50 in the cutting head with the pins 21 will properly locate the blades 35 for each cutting stroke.

The V-shaped cutting edge on the cutting blade 35 will slice rather than shear the belt, resulting in a cleaner cut with less force.

Various modes of carrying out the invention are contemplated as being within the scope of the following claims particularly pointing out and distinctly claiming the subject matter which is regarded as the invention.

We claim:

1. A belt cutting apparatus, comprising a base having a belt supporting surface, clamping means mounted on the base for clamping the belt against said surface, a pivot shaft mounted on said base, a lever arm journaled for pivotal movement on said shaft and mounted to slide axially on said shaft, a cutter head mounted on the lever arm and having a plurality of blades disposed to cut a plurality of slits in the belt as the lever arm is pivoted downwardly in a cutting stroke, and locating means mounted on the cutter head for positioning the cutter head along the width of the belt to correlate the cut slits and provide a series of V-shaped cut fingers in the belt.

2. The apparatus of claim 1, wherein said clamping means comprises a pair of generally parallel spaced clamping bars extending across the width of the belt.

3. The apparatus of claim 2, and including magnetic means interconnecting the base and the clamping bars for clamping the clamping bars to said base.

4. The apparatus of claim 3, wherein said magnetic means comprises a magnet mounted on said base and a magnetically susceptible member attracted to said magnet and disposed on said clamping bars.

5. The apparatus of claim 3, and including elevating means interconnecting each clamping bar and the base for elevating the clamping bars above the base to permit feeding of the belt therebetween.

6. The apparatus of claim 1, and including a cylindrical bushing carried by the lever arm and journaled on said shaft, said bushing permitting pivotal movement and axial sliding movement of said lever arm on said shaft.

7. The apparatus of claim 1, wherein said clamping means comprises a pair of generally parallel spaced clamping bars extending across the width of said belt, said shaft being disposed parallel to said clamping bars.

8. The apparatus of claim 6, wherein said cutter head is mounted on said lever arm at a location spaced from said bushing.

9. The apparatus of claim 1, and including a handle secured to a distal end of said lever arm, and journalling means for journalling the handle for rotation about a horizontal axis on said distal end.

10. The apparatus of claim 1, wherein said cutter head includes a pair of said blades, said blades being spaced apart and disposed at an acute angle with respect to each other, and mounting means for removably mounting said blades to said cutter head.

11. The apparatus of claim 10, wherein said mounting means comprises a pair of converging slots in said cutter head with each slot disposed to receive a blade, each slot being bordered by a first wall and a second wall, each blade bearing against a respective first wall, a connecting member disposed in each slot and disposed flatwise to the respective blade and disposed between said blade and said second wall, said connecting member having a threaded aperture and said blade having a hole aligned with said aperture, and a screw threaded in said aperture and having an end bearing against said second wall, whereby threading of said screw against said second wall will force said connecting member against said blade to clamp said blade against said first wall.

12. The apparatus of claim 1, wherein each blade is generally V-shaped in a longitudinal direction and includes a pair of straight inclined cutting edges joined at an apex disposed centrally of the length of said blade, said apex disposed to initially contact the belt as the lever arm is pivoted downwardly.

13. The apparatus of claim 1, and including a blade shield mounted on the cutting head, said shield having a surface projecting slightly beyond the cutting edge of said blade, and biasing means for biasing said shield in a direction away from the cutting head, said shield being disposed to move inwardly toward the cutting head as the blade penetrates the belt.

14. The apparatus of claim 13, wherein said shield has a generally flat outer surface disposed adjacent the outer edge of the blade and disposed to engage said belt as the blade penetrates the belt.

15. The apparatus of claim 1, wherein said locating means comprises a plurality of first locating members disposed in spaced relation on said base and a plurality of second locating members disposed on said cutter head, said second locating members disposed to engage said first locating members as said lever arm is pivoted downwardly in a cutting stroke.

16. The apparatus of claim 15, wherein said first locating members comprise tapered pins and said second locating members comprise holes to receive the pins.

17. The apparatus of claim 16, wherein said holes are elongated in a direction parallel to the length of said lever arm.

18. The apparatus of claim 1, and including a pair of elongated supports disposed beneath said base and extending generally parallel to the length of the lever arm, and adjusting means for adjusting the position of at least one of said supports in a direction normal to the length of said lever arm.

19. The apparatus of claim 18, wherein said adjusting means comprises an elongated slot in the base, said slot extending in a direction normal to the length of the lever arm, a nut slidably disposed in said slot and a screw extending through said support and engaged with said nut, whereby loosening of said screw and sliding said nut in said slot will adjust the position of said support.

20. The apparatus of claim 12, wherein the supporting surface is composed of a resilient material and the cutting edge of said blade is embedded in said resilient material when said lever arm completes said cutting stroke.

* * * * *